United States Patent
Chen et al.

(10) Patent No.: US 9,641,858 B2
(45) Date of Patent: *May 2, 2017

(54) ARTIFACT-FREE DISPLAYING OF MPEG-2 VIDEO IN THE PROGRESSIVE-REFRESH MODE

(75) Inventors: Xuemin Chen, Irvine, CA (US); Jason Demas, Irvine, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1865 days.

This patent is subject to a terminal disclaimer.

(21) Appl. No.: 12/358,021

(22) Filed: Jan. 22, 2009

(65) Prior Publication Data

US 2009/0129483 A1    May 21, 2009

Related U.S. Application Data

(63) Continuation of application No. 11/113,445, filed on Apr. 22, 2005, now Pat. No. 7,492,824, which is a continuation of application No. 09/870,034, filed on May 29, 2001, now Pat. No. 6,940,904.

(51) Int. Cl.
*H04N 19/51* (2014.01)

(52) U.S. Cl.
CPC .................... *H04N 19/51* (2014.11)

(58) Field of Classification Search
CPC ...... H04N 7/50; H04N 7/26244; H04N 5/145; H04N 7/26765; H04N 7/26015; H04N 19/00024; H04N 19/00224; H04N 19/00272; H04N 19/0003
USPC ........................... 375/240.12, 240.15, 240.25
IPC ..................................... H04N 7/12; H04B 1/66
See application file for complete search history.

(56) References Cited

U.S. PATENT DOCUMENTS

| | | | | |
|---|---|---|---|---|
| 5,253,078 | A | * | 10/1993 | Balkanski et al. ............ 382/250 |
| 5,568,200 | A | | 10/1996 | Pearlstein et al. |
| 5,748,789 | A | * | 5/1998 | Lee et al. ...................... 382/243 |
| 5,926,227 | A | * | 7/1999 | Schoner et al. .............. 348/512 |
| 5,946,419 | A | * | 8/1999 | Chen et al. ................... 382/243 |
| 6,104,753 | A | * | 8/2000 | Kim et al. ................ 375/240.16 |
| 6,421,465 | B2 | * | 7/2002 | Tan ............................... 382/232 |
| 6,442,201 | B2 | * | 8/2002 | Choi ........................ 375/240.12 |
| 6,570,922 | B1 | * | 5/2003 | Wang et al. ............. 375/240.12 |
| 6,940,904 | B2 | * | 9/2005 | Chen et al. .............. 375/240.12 |

(Continued)

FOREIGN PATENT DOCUMENTS

| | | |
|---|---|---|
| EP | 0 485 798 A2 | 5/1992 |
| EP | 1 009 166 A2 | 6/2000 |

OTHER PUBLICATIONS

European Search Report for European Application No. 02090191.4, dated Oct. 5, 2004.

*Primary Examiner* — Tung Vo
(74) *Attorney, Agent, or Firm* — Sterne, Kessler, Goldstein & Fox P.L.L.C.

(57) ABSTRACT

A method and apparatus for decoding and displaying a bitstream, such as, for example, Motorola/GI HITS bitstream, is provided. The method avoids displaying artifacts caused by displaying incompletely decoded pictures after channel acquisition. After the channel acquisition, an entry picture, a P-picture with the refreshed I-slices at the top of the picture, is first displayed with all pixels below the refreshed I-slices zeroed (blacked) out. Then the subsequent P-pictures are displayed with all pixels below their respective refreshed I-slices zeroed out. Once a P-picture has been completely decoded, normal decoding process is started.

20 Claims, 4 Drawing Sheets

(56) References Cited

U.S. PATENT DOCUMENTS

| | | | |
|---|---|---|---|
| 7,492,824 B2 * | 2/2009 | Chen et al. | 375/240.16 |
| 2001/0026677 A1 * | 10/2001 | Chen et al. | 386/68 |
| 2002/0048321 A1 | 4/2002 | Katayama | |

* cited by examiner

ARTIFACT-FREE DISPLAYING OF MPEG-2 VIDEO IN THE PROGRESSIVE-REFRESH MODE

CROSS REFERENCE TO RELATED APPLICATIONS

This application is a continuation of U.S. patent application Ser. No. 11/113,445, filed Apr. 22, 2005, entitled "Artifact-Free Displaying of MPEG-2 Video in the Progressive—Refresh Mode, which is a continuation of U.S. patent application Ser. No. 09/870,034, filed May 29, 2001 (now U.S. Pat. No. 6,940,904) entitled "Artifact-Free Displaying of MPEG-2 Video in the Progressive-Refresh Mode," both of which are incorporated by reference herein in their entireties.

BACKGROUND

Field of the Invention

Embodiments of the present invention are related to decoding of MPEG-2 video stream, and particularly to a method and apparatus for artifact-free decoding and displaying of MPEG-2 video in a progressive-refresh mode.

Background

Conventional MPEG-2 decoders typically do not have any capability for special handling of progressive refresh bitstreams, which do not contain intra-pictures (I-pictures), and in which a portion of each prediction-picture (P-picture) is independently decodable. In progressive refresh bitstreams, the decodable portion of each P-picture in a set of P-pictures typically moves from top to bottom, starting at the top of the first P-picture in the set and ending at the bottom of the last P-picture in the set. Hence, no P-picture is completely refreshed (or decoded) until a set of P-pictures has been decoded so that each portion of an entire picture area is refreshed in at least one of the P-pictures. Thus, display of artifacts is often unavoidable after channel acquisition (e.g., due to switching channel) since the first few anchor pictures are typically not completely refreshed P-pictures.

Therefore, it is desirable to provide an apparatus and method for preventing artifacts from being displayed after channel acquisition.

BRIEF SUMMARY OF THE INVENTION

In one embodiment of the present invention, a method of displaying a progressive refresh bitstream is provided. The progressive refresh bitstream comprises a plurality of P-pictures. A first P-picture containing a first section, which comprises one or more I-slices, is decoded. Pixels of the first P-picture, except for those corresponding to the first section, are zeroed out prior to displaying the first P15 picture. Then, the first P-picture is displayed.

In another embodiment of the present invention, an apparatus for decoding and displaying a progressive refresh bitstream is provided. The progressive refresh bitstream comprises a plurality of P-pictures. The apparatus comprises a decoder for decoding the P-pictures, means for zeroing out pixels of the P-pictures, and a display for displaying the P-pictures. The decoder decodes a first P-picture containing a first section, which comprises one or more I-slices. The zeroing out means zeroes out pixels of the first P-picture, except for the pixels that correspond to the first section. The display displays the first P-picture with the pixels, except for the pixels that correspond to the first section, zeroed out.

In yet another embodiment of the present invention, a system for encoding and decoding a progressive refresh bitstream is provided. The system comprises an encoder for encoding video to generate the progressive refresh bitstream. The progressive refresh bitstream comprises a plurality of P-pictures. The system also comprises a decoder for decoding the P-pictures, a transmission medium for carrying the progressive refresh bitstream from the encoder to the decoder, means for zeroing out pixels of the P-pictures, and a display for displaying the P-pictures. The decoder decodes a first P-picture containing a first section, which comprises one or more I-slices. The zeroing out means zeroes out pixels of the first P-picture, except for the pixels that correspond to the first section. The display displays the first P-picture with the pixels, except for the pixels that correspond to the first section, zeroed out.

BRIEF DESCRIPTION OF THE DRAWINGS/FIGURES

These and other aspects of the invention may be understood by reference to the following detailed description, taken in conjunction with the accompanying drawings, which are briefly described below.

The present invention will now be described with reference to the accompanying drawings.

DETAILED DESCRIPTION

Within an MPEG-2 coded bitstream, the coded picture following a group of pictures (GOP) header is an I-picture. However, if there is no GOP header in the bitstream, I-pictures are not mandated in the bitstream. The use of "no I-picture" bitstreams typically results in savings to transmission bandwidth since an I-picture generally contains more bits than a bi-directional picture (B-picture) or P-picture generated for the same image. One such "no I-picture" bitstream is called HITS (headend-in-the-sky) progressive refresh bitstream used by Motorola, Inc., formerly General Instrument (GI). The GI HITS bitstream (or HITS bitstream) is MPEG-2 compliant, and may be used to provide PCI/cable services and/or other video transmission services.

When some MPEG-2 encoders, such as, for example, the DigiCipher® II encoder available from Motorola, Inc., Schaumburg, Ill., are configured for progressive refresh, the refresh depth can be specified. This depth can range from 1 to 9 slices per P-picture to be refreshed. The default value in the case of the DigiCipher® II encoder is three slices per P-picture while B-pictures are enabled and one slice per P20 picture while B-pictures are disabled. One typical configuration in the case of the DigiCipher® II encoder is six slices per P-picture while "two B-picture mode" is enabled.

In a HITS bitstream, number of slices equaling the refresh depth are forced to be I-slices in each P-picture, and these I-slices are often referred to as "refreshed I-slices." In the progressive refresh mode, the location of the refreshed I-slices in a set of P-pictures (for an image) moves from the top at the first picture in the set to the bottom of the last picture in the set, and moves back to the top at the next set of P-pictures. In the progressive refresh mode, both intra_slice_flag and intra_slice are set to "1" for the refreshed intra slices. For ordinary (non-refreshed) I-slices, the intra_slice flag is not set to "1".

When I-pictures are not used during MPEG-2 decoding, e.g., in the case of the HITS bitstream, none of the pictures is completely decoded until the refreshed I-slices corresponding to an entire image area, from top to bottom (each P-picture including one or more refreshed I-slices) have been decoded. If a picture is displayed prior to complete decoding of at least one picture following channel acquisition, undesirable artifacts typically appear since at least a portion of the displayed picture then would remain undecoded. The embodiments of the present invention preferably prevent these undesirable artifacts from being displayed while decoding and displaying progressive refresh (e.g., HITS) bitstreams.

Figure 1:
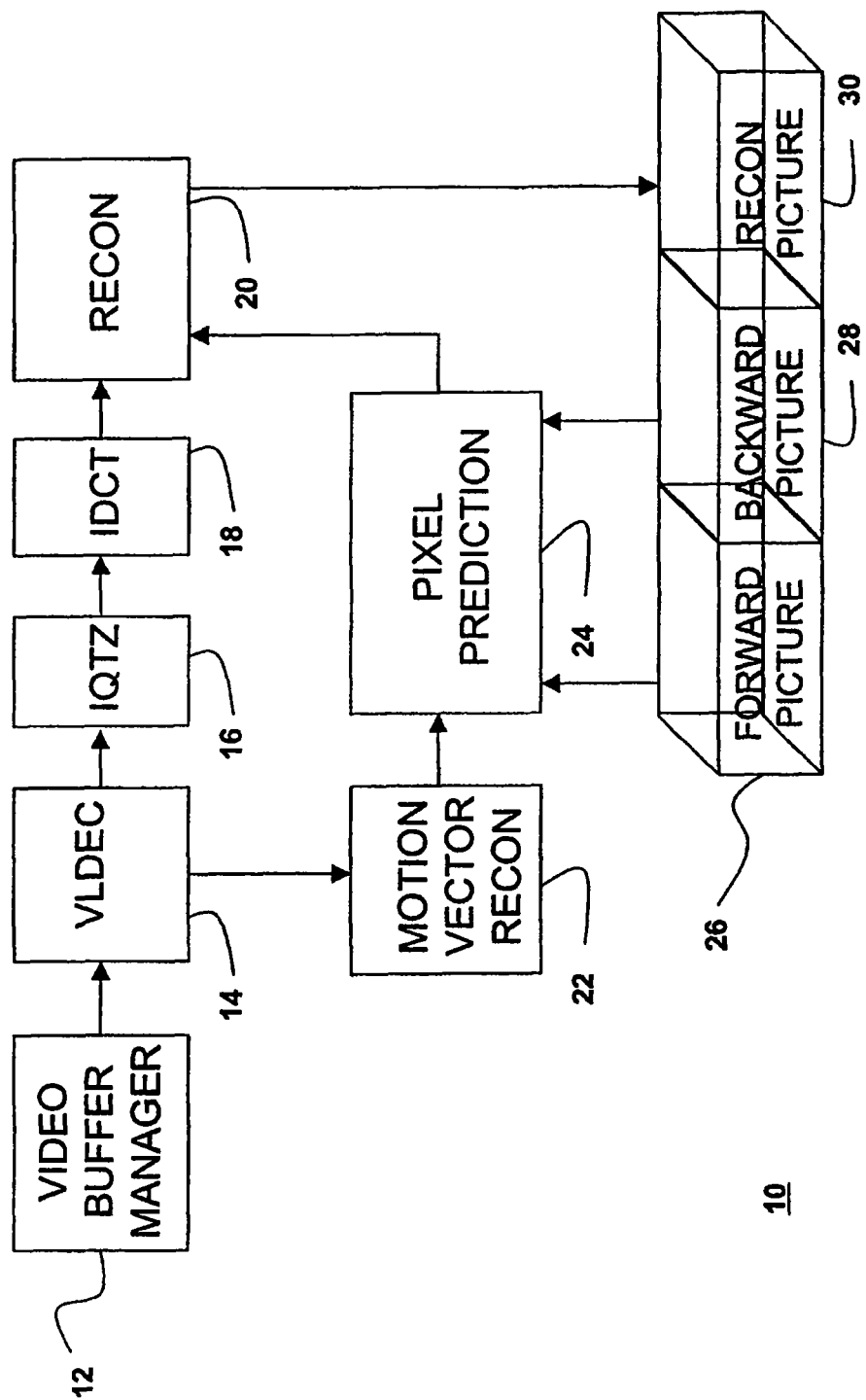
FIG. 1 is a block diagram illustrating MPEG-2 decoding 20 process, which may be used to implement one embodiment of the present invention.

FIG. 1 is a block diagram of an exemplary MPEG-2 decoder, which may be used to implement an embodiment according to the present invention. A video buffer manager 12 receives an MPEG-2 coded bitstream, such as, for example, the HITS bitstream, and provides the MPEG-2 bitstream to a VLDEC (variable length decoder) 14, which may be a Huffman decoder.

The HITS bitstream may comprise MPEG-2 video streams that are compatible with Main Profile at Main Level (MP@ML), Main Profile at High Level (MP@HL), and 4:2:2 Profile at Main Level (4:2:2@ML), including ATSC (Advanced Television Systems Committee) HDTV (high definition television) video streams, as well as any other standard digital cable and satellite streams.

The VLDEC 14 sends encoded picture (macroblocks) to an inverse quantizer (IQTZ) and inverse discrete cosine transform block (IDCT) 18 for decoding. Meanwhile, the VLDEC 14 extracts motion vector information from the MPEG-2 bitstream and sends it to a motion vector reconstructor 22 for reconstruction of motion vectors.

The motion vector reconstructor 22 sends the reconstructed motion vectors to a pixel prediction block 24 which uses pictures (frames or fields) from a forward picture buffer 26 and/or a backward picture buffer 28, together with the motion vectors, to predict pixels and provide them to a picture reconstructor 20. For example, when the MPEG-2 decoder 10 is used to decode the HITS bitstream, the motion vector search range of the motion vectors generated by the motion vector reconstructor 22 preferably is limited in each P-picture to a portion corresponding to portions containing the refreshed I-slices in previously decoded P-pictures.

The picture reconstructor 20 uses the predicted pixels and the decoded picture from the IDCT 18 to reconstruct the picture that was encoded by an encoder, such as, for example, the DigiCipher® II encoder. The reconstructed picture is then stored in a reconstructed picture buffer 30, and may be displayed in accordance with a display order. The reconstructed picture may also be used as a forward picture and/or backward picture for decoding of other pictures.

The reconstructed pictures may be in Standard Definition television (SDTV) and/or High Definition television (HDTV) formats. Further, the reconstructed pictures may be converted to and/or displayed in one or more of analog and/or digital video formats, which may include, but are not limited to, both component (e.g., $YP_RP_B$, $YC_RC_B$ and RGB) and composite video, e.g., NTSC, PAL or SECAN format video, or Y/C (S-video) compatible formats. The reconstructed pictures may also be converted to be displayed on a Digital Visual Interface (DVI) compatible monitor or converted to be in any other customized display formats.

Figure 2:
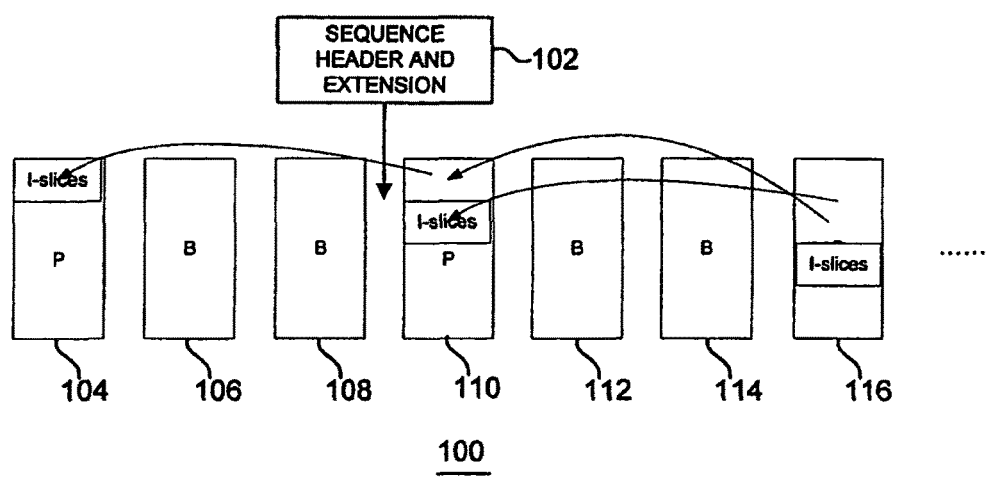
FIG. 2 illustrates motion vector search range during a progressive-refresh mode.

FIG. 2 illustrates motion vector search range during a progressive-refresh mode, which may be used in an embodiment according to the present invention. When an MPEG-2 encoder, such as, for example, the DigiCipher® II encoder, is configured for progressive refresh, the vertical search range for motion vectors in a P-picture preferably is restricted. The motion vectors for the macroblocks located above the refreshed I-slices in the current P-picture should point only to the region above the refreshed slices in the previous P10 picture. In other words, these motion vectors may not search below the lowest refreshed I-slice in the previous P-picture.

For example, FIG. 2 shows a sequence 100 of P-pictures 104, 110, 116 and B-pictures 106, 108, 112, 114 of an MPEG-2 video stream in progressive-refresh mode. Each of the P15 pictures 104, 110 and 116 includes one or more intra slices (I-slices) The sequence 100 illustrates a picture sequence with M=3 where the value of N is one more than the number of consecutive B pictures between two consecutive P pictures.

The P-picture 104 has refreshed I-slices at the top of the picture. The vertical search range for motion vectors in the P-picture 110 preferably is limited to the refreshed I-slices region of the P-picture 104. Further, the vertical search range for motion vectors in the P-picture 116 preferably is limited to the refreshed I-slices regions of the P-pictures 104 and 110.

Sequence header and extension 102 may be inserted before any P-picture, e.g., before the P-picture 110 in FIG. 1. The sequence header contains information used for display of pictures, such as, for example, picture size, bit rate, and the like. Since sequence header is typically needed for displaying MPEG-2 pictures, the nearest sequence header is parsed to obtain the display information.

Since each P-picture in a progressive-refresh bitstream contains refreshed I-slices for independent decoding of only a portion of the P-picture, in order to obtain a completely refreshed P-picture, a number of prior P-pictures, each containing refreshed I-slices, should be decoded.

The following process may be used to determine the minimum number of P-pictures required for obtaining a completely refreshed P-picture.

For example, suppose:
1) num_of_slices=vertical_size/16;
2) refresh_depth: number of refreshed I-slices in a P-picture; and
3) first_intra_slice: the vertical location of the first refreshed I-slice in a P-picture in an embodiment according to the present invention may be computed by

```
if (picture_type==P-picture)
{
    for (iRow==0; iRow<num_of_slices; iRow++)
    {
    next_start_code( );
        slice_num= slice_start_code&0x000000FF;
        if (intra_slice_flag)
            break;
    }
    first_intra_slice = slice_num-1;
}
```

The minimum number of prior P-pictures needed to be decoded for complete decoding of the P-picture in this example is given by:

$$N_p = \begin{cases} \dfrac{\text{num\_of\_slices} + \text{first\_intra\_slice}}{\text{refresh\_depth}}, & 1 \le \text{first\_intra\_slice} < \text{num\_of\_slices} - \text{refresh\_depth}; \\ \dfrac{\text{num\_of\_slice}}{\text{refresh\_depth}} - 1, & \text{first\_intra\_slice} = \text{num\_of\_slices} - \text{refresh\_depth}. \end{cases}$$

For example, Table 1 below shows the minimum number of prior P-pictures needed to be decoded for the vertical_size=480 for complete decoding of a P-picture. The num_of_slices in this case is equal to vertical_size/16=30.

TABLE 1

The Minimum Number of Prior P-Pictures Needed to Be Decoded for Complete Decoding

| refresh_depth | first_intra_slice | Np | Notes |
|---|---|---|---|
| 6 | 0 | 5 | |
| 6 | 24 | 4 | the best case |
| 6 | 18 | 8 | the worst case |
| 3 | 3 | 11 | |
| 3 | 27 | 9 | the best case |
| 3 | 24 | 18 | the worst case |

In an MPEG-2 encoding/decoding system without a provision for special handling of progressive refresh bitstreams, artifacts are often unavoidable after channel acquisition (e.g., after switching channel) since the first few anchor pictures are usually not "completely refreshed" P-pictures. Accordingly, the artifacts may be displayed on a monitor or television while the first completely refreshed picture to be displayed is being decoded.

Figure 3:
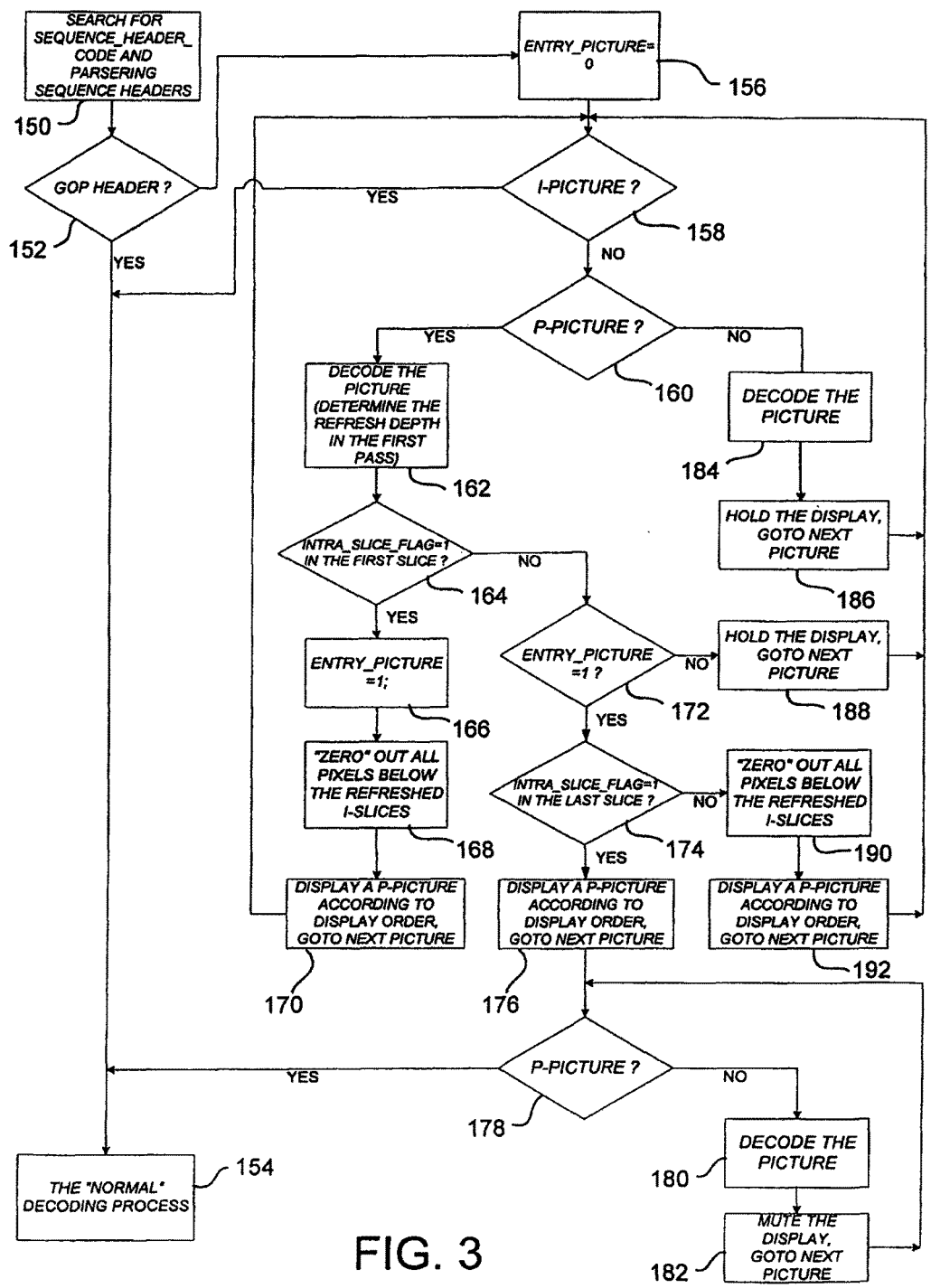
FIG. 3 is a flow diagram of an exemplary process of handling decoding after channel acquisition in an embodiment according to the present invention.

FIG. 3 illustrates an exemplary process of handling decoding after channel acquisition in an embodiment according to the present invention. To remove "channel acquisition" artifacts, the process of FIG. 3 includes a special procedure for handling the first few pictures after the "channel acquisition". In FIG. 3, an entry picture is defined as the first P-picture with the top slice being a refreshed I-slice. Using the process of FIG. 3, performance enhancement for decoding and displaying of progressive refresh bitstreams may be realized.

In step 150, the process of FIG. 3 preferably searches for sequence headers and parses them when found. During parsing, information needed for displaying the pictures, such as, for example, picture size and bit rate, is extracted. If a GOP header follows the sequence header as indicated in step 152, a normal decoding process takes place as indicated in step 154, since the GOP header in MPEG-2 video stream would indicate that the following picture is an intra picture (I-picture), and therefore no special procedure is required after channel acquisition. In other words, in this case, the MPEG-2 video stream is not a progressive refresh bitstream, such as, for example, the HITS bitstream.

If a GOP header does not follow the sequence level headers, the entry_picture preferably is set to 0 as indicated in step 156. The setting of entry_picture to 0 preferably clears the variable entry_picture so that the default value is that the current picture is not an entry picture. If the picture is an I-picture as indicated in step 158, the process preferably proceeds to step 154 for normal decoding. If the picture is not an I-picture, a determination preferably is made in step 160 as to whether the picture is a P-picture.

If the process in step 160 determines that the picture is not a P-picture, the picture preferably is decoded as indicated in step 184, but preferably is not displayed as indicated in step 186 since the display of an incompletely decoded picture would include artifacts. Then the process preferably repeats with the next picture, starting with determination of whether it is an I-picture or not as indicated in step 158. In other embodiments, the picture may not be decoded if it is neither an I-picture nor a P-picture, since it probably is a B-picture, and B-pictures are typically not decoded or displayed in the absence of a completely decoded picture on both sides (before and after the B-pictures) of them.

If the picture is a P-picture, the picture is decoded in step 162. During decoding, the refresh depth is determined in the first pass since the refresh depth is needed to determine the number of refreshed I-slices to be decoded in each P-picture. During the first path, the first refreshed I-slices may be found and the refresh depth obtained from them, but not necessarily decoded since the display begins with the entry picture. In step 164, a determination is made as to whether the intra_slice_flag=1 in the first slice. In other words, step 164 preferably determines whether or not the picture is an entry picture, the first P-picture with the top slice being a refreshed I-slice. If the picture is an entry picture, the entry_picture variable preferably is set to 1 in step 166 to indicate that the entry picture is being processed.

Then in step 168, all pixels below the refreshed I-slices (in this case, I-slices of the entry picture) preferably are zeroed out so that none of the non-refreshed portion (containing artifacts) of the P-picture is displayed. In step 170, the P-picture is displayed according to display order, and the process repeats with the next picture for processing, starting with determination of whether the picture is an I-picture or not in step 158.

It should be noted that the display order may not be the same as the decode order in MPEG-2 video. For example, when the MPEG-2 video stream includes a sequence of pictures $P_1B_1B_2P_2$ (in display order), the B-pictures $B_1$ and $B_2$ are displayed before the second P-picture P2. However, in order to decode the B-pictures $B_1$ and $B_2$, the second P-picture $P_2$ must be decoded first. So the decode order in this case would be $P_1P_2B_1B_2$, which is different from the display order.

If it is determined that intra_slice_flag is not equal to 1 in the first slice in step 164, the process in step 172 preferably checks whether the entry_picture=1 to determine whether an entry picture has already been received. If the entry picture has not been received as determined in step 172, the display is held as indicated in 188 since the top of the picture would contain artifacts in the absence of a received entry picture, and displaying of this picture would result in displaying of artifacts at the top of the picture. Then the process preferably repeats with the next picture, starting with determination of whether it is an I-picture or not as indicated in step 158.

If the entry picture has been received previously, i.e., entry_picture=1, as determined in step 172, the process in step 174 preferably determines whether the intra_slice_flag=1 in the last slice, which would indicate that the picture can be completely decoded, since both the entry picture (with refreshed I-slices at the top) and the picture with the refreshed I-slices at the bottom (and all the pictures in between) have been refreshed.

If the last slice is not a refreshed I-slice, the process in step 190 preferably zeroes out all pixels below the refreshed I-slices. Then the process in step 192 preferably displays a P-picture according to display order, and goes onto the next picture to repeat the process, starting with the determination of whether the next picture is an I-picture or not as indicated in step 158.

If the last slice is a refreshed I-slice, the process preferably displays a P-picture according to display order in step 176, and moves on to the next picture. In this case, pixels are not zeroed out since now the bottom of the picture includes refreshed I-slices, and therefore the P-picture is completely decodable. Then the process in step 178 determines whether or not the next picture is a P-picture. If it is a P-picture, the process in step 154 starts a normal decoding process since at least one fully decoded picture is now available.

If the picture is not a P-picture, e.g., if the picture is a B-picture, the process in step 180 decodes the picture. However, the display is muted as indicated in step 182 since complete decoding (refreshing) of at least two P-pictures are typically required for complete decoding of B-pictures. Thus, the process preferably repeats steps 178, 180 and 182 with one or more next pictures until a P-picture is determined in step 178. In other embodiments, if the picture is not a P-picture, as determined in step 178, it may not even be decoded since it is not displayed anyway.

Using the process of FIG. 3, an image (which may be composited from a sequence of pictures), starting with the entry picture, is painted from top to bottom on a display device (e.g., television or monitor) after the channel acquisition, with yet-to-be refreshed portion of the image blacked (zeroed) out. This way, undesirable artifacts are not displayed on the display device, and the viewer does not have to wait for a period of time (e.g., a few seconds) for the first displayed picture of the progressive refresh bitstream to be completely decoded after the channel acquisition. Otherwise, the viewer may have to wait for a few seconds wondering whether his set-top box or other component of the media distribution system is malfunctioning.

Figure 4:
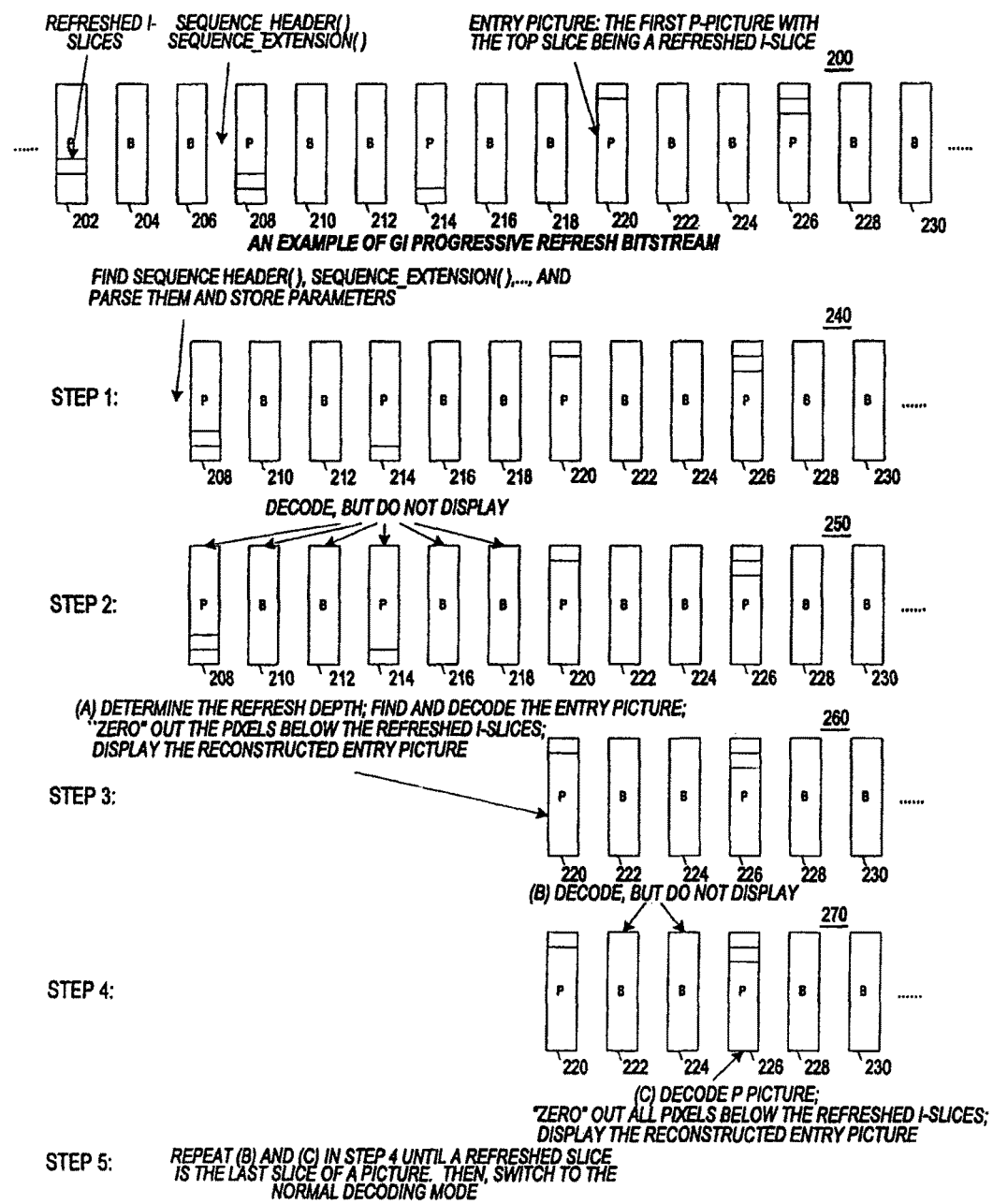
FIG. 4 is a step-by-step example of a process of handling decoding after channel acquisition in an embodiment according to the present invention.

FIG. 4 is a step-by-step example of a process of handling decoding after channel acquisition in an embodiment according to the present invention. A picture sequence 200 of FIG. 4 is an example of a progressive refresh bitstream, such as, for example, the GI HITS bitstream. The picture sequence 200 includes P-pictures 202, 208, 214, 220, 226 and B-pictures 204, 206, 210, 212, 216, 218, 222, 224, 228, 230. In practice, the progressive refresh bitstream may include a number of pictures both before and after the picture sequence 200. Also, the picture sequence 200 illustrates a display order, and the transmission order and/or the decoder order may be different. Further, other GI HITS bitstreams may not include B-pictures.

Each of the P-pictures 202, 208, 214, 220, 226 preferably includes one or more refreshed I-slices. A sequence header and a sequence extension preferably are inserted between the B-picture 206 and the P-picture 208. In other embodiments and/or other examples of this embodiment, the sequence header and the sequence extension may be inserted at other suitable location throughout the progressive refresh bitstream. The P-picture 220 is an entry picture, which is defined as the first P-picture with the top slice being a refreshed I-slice.

As illustrated in step 1 (240), the process preferably searches for and finds a sequence header and sequence extension, preferably parses them, and stores parameters, such as, for example, picture size and bit rate.

As illustrated in step 2 (250), the process preferably decodes the P-pictures 208, 214 and B-pictures 210, 212, 216, 218, but preferably does not display them since displaying these pictures would introduce undesirable artifacts at the top of the displayed image since each of these pictures is ahead of the first entry picture in display order. In other embodiments, the P-pictures 208 and 214 may be decoded, but the B-pictures 210, 212, 216 and 218 may not be decoded.

The P-picture 220 is an entry picture having refreshed I-slices at the top of the picture. As illustrated in step 3 (260), a refresh depth preferably is determined (may be through the first pass form a previous non-displayed P-picture, e.g., the P-picture 208), and when the P-picture 220 is encountered and recognized as an entry picture, it is decoded. Then the pixels below the refreshed I-slices preferably are zeroed out, and the entry picture with the zeroed out pixels below the refreshed I-slices is displayed.

In other embodiments, the entry picture may have refreshed I-slices at other sections of the picture, for example, at the bottom of the picture or any other suitable location. In an embodiment where the entry picture has refreshed I-slices at the bottom of the picture, for example, an image (which may be composited from a sequence of pictures), starting with the entry picture, may be painted from bottom to top on a display device (e.g., television or monitor) after the channel acquisition, with yet-to-be refreshed portion of the image (above the refreshed I-slices) blacked (zeroed) out. In this embodiment, for example, the motion vector search range may be limited to below the refreshed I-slices of the current P-picture until at least one picture is decoded completely.

As illustrated in step 4 (270), the B-pictures 222, 224 may be decoded but preferably are muted from being displayed. Instead, the decoded entry picture (with the pixels below the refreshed I-slices blacked out) continues to be displayed. In other embodiments, the B-pictures 222 and 224 may not even be decoded.

Next, the P-picture 226 preferably is decoded and all pixels below the refreshed I-slices preferably are zeroed out. Then the P-picture 226 with the zeroed out pixels below the refreshed I-slices is displayed.

In step 5, the process of decoding the B-pictures, but muting them, decoding the next P-picture, zeroing out pixels below the refreshed I-slices, and displaying the reconstructed P-picture preferably are repeated until the last slice of a P-picture is a refreshed I-slice. Then, the process preferably switches to the normal decoding (and displaying) mode.

To verify the embodiments of the present invention, a C-model simulation code has been developed on a basis of the ISO/IEC 13818-5 software. The simulation has been conducted by processing captured GI HITS progressive-refresh video streams. The results of the simulation show that the embodiments of the present invention successfully eliminate decoding artifacts after "channel acquisition".

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

What is claimed is:

1. A method of decoding a plurality of images from a bitstream of encoded images, comprising:
    decoding a first encoded image comprising a first independently decodable portion to generate a first decoded image; and
    zeroing out pixels that correspond to pixels outside of the first independently decodable portion of the first decoded image and that require prior decoding of an unavailable encoded image.

2. The method according to claim 1, further comprising:
    after zeroing out the pixels, displaying the first decoded image.

3. The method according to claim 1, further comprising:
    decoding a second encoded image comprising a second independently decodable portion to generate a second decoded image; and
    zeroing out pixels of the second decoded image that correspond to pixels outside of the second independently decodable portion.

4. The method according to claim 3, wherein decoding the second encoded image further comprises:
    using the first independently decodable portion of the first encoded image to decode a corresponding portion of the second encoded image.

5. The method according to claim 4, further comprising:
    after zeroing out pixels of the second decoded image, displaying the second decoded image.

6. The method according to claim 1, further comprising:
    determining a refresh depth of the bitstream equal to a number of contiguous independently decodable portions of an encoded image of the bitstream.

7. The method according to claim 1, wherein the bitstream further comprises a plurality of bi-directionally dependent encoded images.

8. The method according to claim 1, wherein encoded images ahead of the first encoded image in display order are not displayed.

9. A method of decoding a plurality of images from a bitstream of encoded images, comprising:
    decoding encoded images each comprising an independently decodable portion to generate decoded images; and
    for each of the decoded images, zeroing out pixels that correspond to pixels outside of the independently decodable portion of the decoded image and that require prior decoding of an unavailable encoded image.

10. The method according to claim 9, further comprising:
    after zeroing out the pixels, displaying the decoded images.

11. The method according to claim 9, further comprising:
    using the independently decodable portion of a first one of the encoded images to decode a corresponding portion of a second one of the encoded images.

12. The method according to claim 9, further comprising:
    determining a refresh depth of the bitstream equal to a number of contiguous independently decodable portions of an encoded image of the bitstream.

13. The method according to claim 9, wherein the bitstream further comprises a plurality of bi-directionally dependent encoded images.

14. A computer program product comprising a non-transitory computer readable medium having control logic stored thereon, said control logic for causing a computer to decode a plurality of images from a bitstream of encoded images, said control logic comprising:
    a first computer readable medium code that causes the computer to decode encoded images each comprising an independently decodable portion to generate decoded images; and
    a second computer readable medium code that causes the computer to, for each of the decoded images, zero out pixels that correspond to pixels outside of the independently decodable portion of the decoded image and that require prior decoding of an unavailable encoded image.

15. The computer program product according to claim 14, further comprising:
    a third computer readable medium code that causes the computer to display the decoded images after zeroing out the pixels.

16. The computer program product according to claim 14, further comprising:
    a third computer readable medium code that causes the computer to use the independently decodable portion of a first one of the encoded images to decode a corresponding portion of a second one of the encoded images.

17. The computer program product according to claim 14, further comprising:
    a third computer readable medium code that causes the computer to determine a refresh depth of the bitstream equal to a number of contiguous independently decodable portions of an encoded image of the bitstream.

18. The computer program product according to claim 14, wherein the bitstream further comprises a plurality of bi-directionally dependent encoded images.

19. The method according to claim 1, wherein the unavailable encoded image is unavailable due to switching channels.

20. The computer program product according to claim 14, wherein the unavailable encoded image is unavailable due to switching channels.

* * * * *